United States Patent
Kazaoka

(10) Patent No.: US 10,391,930 B2
(45) Date of Patent: Aug. 27, 2019

(54) VEHICULAR LAMP AND VEHICULAR EXTERIOR REAR VIEW DEVICE

(71) Applicant: Koito Manufacturing Co., Ltd., Tokyo (JP)

(72) Inventor: Shigehiko Kazaoka, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 50 days.

(21) Appl. No.: 15/709,528

(22) Filed: Sep. 20, 2017

(65) Prior Publication Data

US 2018/0086252 A1    Mar. 29, 2018

(30) Foreign Application Priority Data

Sep. 23, 2016    (JP) .................................. 2016-185315

(51) Int. Cl.
| | |
|---|---|
| *B60Q 1/26* | (2006.01) |
| *B60R 1/12* | (2006.01) |
| *B60R 11/04* | (2006.01) |
| *F21S 43/237* | (2018.01) |
| *F21S 43/247* | (2018.01) |
| *F21S 43/245* | (2018.01) |
| *F21S 43/19* | (2018.01) |
| *F21S 43/14* | (2018.01) |
| *B60Q 1/34* | (2006.01) |

(Continued)

(52) U.S. Cl.
CPC .......... *B60Q 1/2665* (2013.01); *B60R 1/1207* (2013.01); *B60R 11/04* (2013.01); *F21S 43/19* (2018.01); *F21S 43/237* (2018.01); *F21S 43/245* (2018.01); *F21S 43/247* (2018.01); *B60Q 1/34* (2013.01); *B60R 1/06* (2013.01); *B60R 2001/1253* (2013.01); *F21S 43/14* (2018.01); *F21W 2103/25* (2018.01)

(58) Field of Classification Search
CPC ......... B60Q 1/2665; B60Q 1/34; F21S 43/14; F21S 43/19; F21S 43/237; F21S 43/245; F21S 43/247; B60R 1/06; B60R 1/1207; B60R 2001/1253; B60R 11/04; F21W 2103/25

See application file for complete search history.

(56) References Cited

U.S. PATENT DOCUMENTS

| | | | |
|---|---|---|---|
| 7,357,549 B2 * | 4/2008 | Gunther | B60Q 1/2665 362/494 |
| 8,514,064 B2 * | 8/2013 | Fukasawa | B60Q 1/2665 340/465 |

(Continued)

FOREIGN PATENT DOCUMENTS

JP    2007-250290 A    9/2007

*Primary Examiner* — Alan B Cariaso
(74) *Attorney, Agent, or Firm* — Abelman, Frayne & Schwab

(57) ABSTRACT

A vehicular lamp includes a light guide body configured with a two-color molded article of a light-transmitting member and a non-translucent member, and a light source configured to introduce light to the translucent member. The light guide body has a curved portion. The translucent member has a reflective step formed on a first surface thereof, which is in contact with the non-translucent member, so as to emit the light of the light source from a second surface, which is opposite the first surface. The second surface is exposed to an outside of a vehicle body on which the vehicular lamp is mounted.

9 Claims, 2 Drawing Sheets

(51) Int. Cl.
*B60R 1/06* (2006.01)
*F21W 103/25* (2018.01)

(56) References Cited

U.S. PATENT DOCUMENTS

| | | | |
|---|---|---|---|
| 2006/0146555 A1* | 7/2006 | Inaba | B60Q 1/2665 362/494 |
| 2008/0068851 A1* | 3/2008 | Waldmann | B60Q 1/2665 362/494 |
| 2009/0284365 A1* | 11/2009 | Wagner | B60Q 1/2665 340/465 |
| 2010/0091508 A1* | 4/2010 | Fukasawa | B60Q 1/2665 362/494 |
| 2016/0341393 A1* | 11/2016 | Kurschner | B60Q 1/2607 |

* cited by examiner

VEHICULAR LAMP AND VEHICULAR EXTERIOR REAR VIEW DEVICE

CROSS-REFERENCE TO RELATED APPLICATIONS

This application is based on and claims priority from Japanese Patent Application No. 2016-185315, filed on Sep. 23, 2016, with the Japan Patent Office, the disclosure of which is incorporated herein in its entirety by reference.

TECHNICAL FIELD

The present disclosure relates to a vehicular lamp and a vehicular exterior rear view device. More particularly, the present disclosure relates to a vehicular lamp used in a vehicle such as, for example, an automobile, and a vehicular exterior rear view device including the vehicular lamp.

BACKGROUND

Generally, a vehicle is provided with, for example, a side mirror as a device disposed outside a vehicle body and shows the rear side of the vehicle (hereinafter, appropriately referred to as a "vehicular exterior rear view device"). In addition, there is known a conventional technology in which a side turn signal lamp is mounted on a side mirror (see, e.g., Japanese Patent Laid-Open Publication No. 2007-250290).

SUMMARY

Recently, a technology to miniaturize a vehicular exterior rear view device by replacing a rear view mirror with a camera has been developed. When the vehicular exterior rear view device is miniaturized, a space for mounting a vehicular lamp such as, for example, a side turn signal lamp is also reduced. Therefore, it is required to miniaturize the vehicular lamp.

The present disclosure has been made in view of such a circumstance, and the present disclosure provides a technology for miniaturizing a vehicular lamp.

In order to solve the above-mentioned problem, one aspect of the present disclosure provides a vehicular lamp. The vehicular lamp includes a light guide body configured as a two-color molded article of a light-transmitting member and a non light-transmitting member, and a light source configured to introduce light to the light-transmitting member. The light guide body has a curved portion. The light-transmitting member has a reflective step formed on a first surface thereof, which is in contact with the non light-transmitting member, so as to emit the light of the light source from a second surface of the transmitting member member, which is opposite the first surface. The second surface is exposed outside a vehicle body on which the vehicular lamp is mounted. According to this aspect, the vehicular lamp may be miniaturized.

In the aspect, the light guide body may have a rod shape. In addition, in the aspect, the vehicular lamp may be mounted in a vehicular exterior rear view device.

In addition, another aspect of the present disclosure provides a vehicular exterior rear view device. This device includes a rear view unit including at least one of a rearview mirror and a rear view camera, a cover disposed on a vehicle body front side of the rear view unit, and the vehicular lamp according to the first aspect. In this aspect, the cover may have a through hole formed in a predetermined position so as to connect an inside and an outside of the cover, and the vehicular lamp may be fixed to the cover in a state where the light source is located inside the cover and the light guide body is inserted through the through hole so as to be exposed outside the cover.

According to the present disclosure, a vehicular lamp may be miniaturized.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
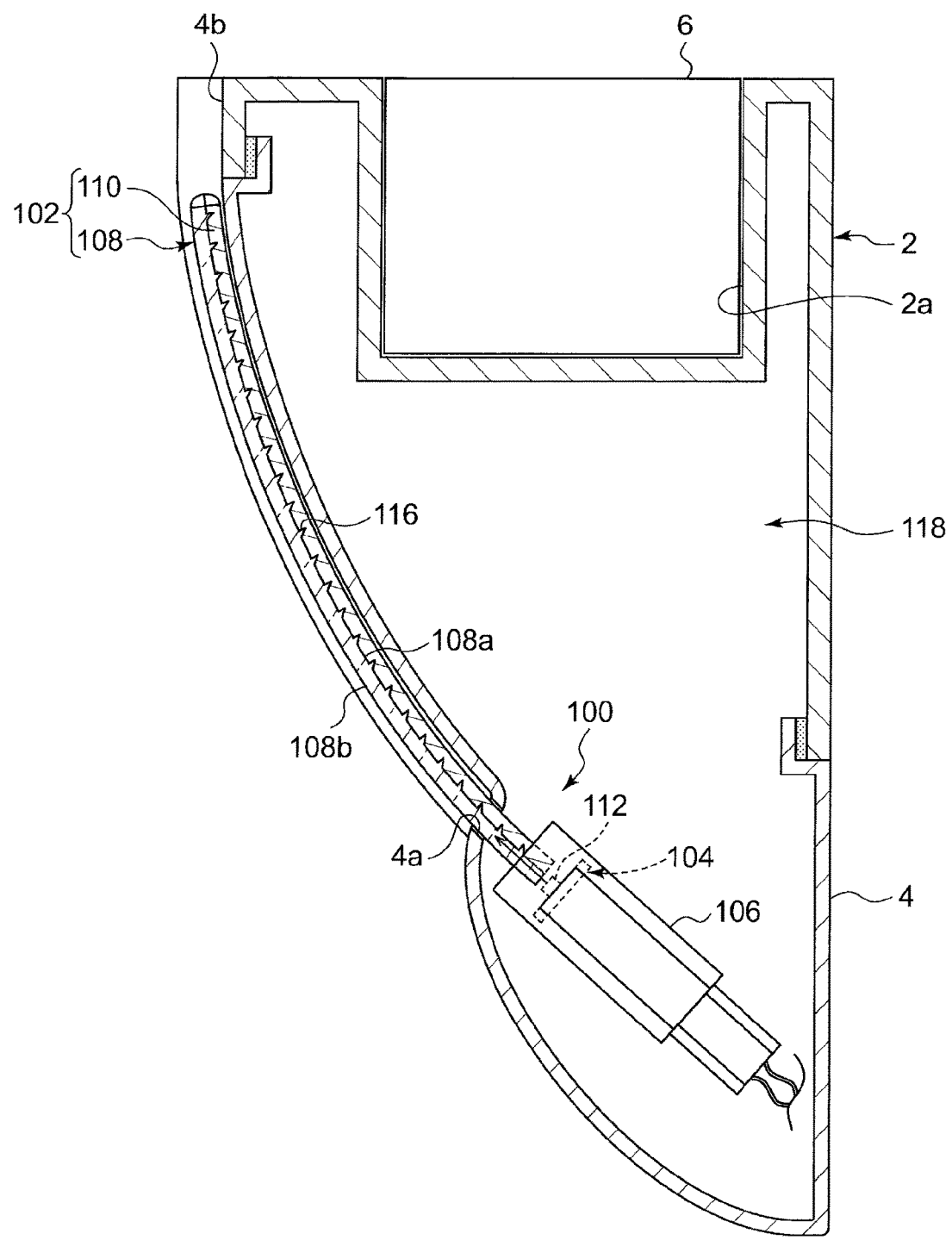
FIG. 1 is a horizontal cross-sectional view illustrating a schematic structure of a vehicular exterior rear view device according to an exemplary embodiment.
Figure 2A:
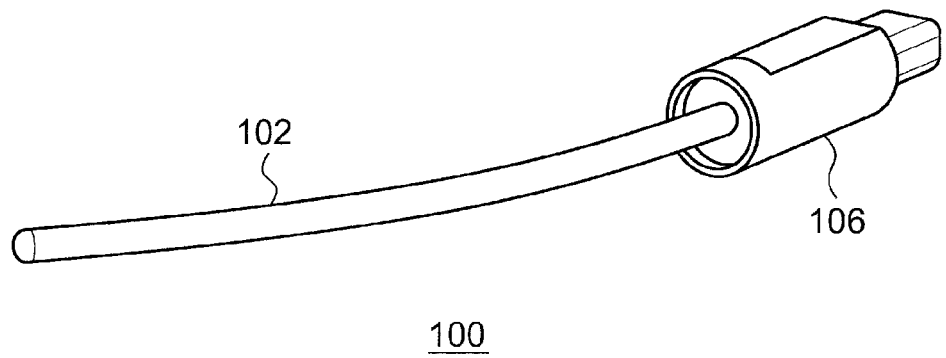
FIG. 2A is a perspective view illustrating a schematic structure of a vehicular lamp according to an exemplary embodiment.
Figure 2B:
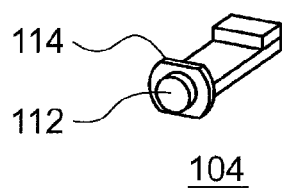
FIG. 2B is a perspective view illustrating a schematic structure of a light source included in the vehicular lamp according to an exemplary embodiment.

Hereinafter, the present disclosure will be described based on appropriate exemplary embodiments with reference to the accompanying drawings. The exemplary embodiments do not limit the present disclosure, but are illustrative, and all the features or combinations described in the exemplary embodiments are not necessarily essential to the present disclosure. The same reference numerals are given to the same or equivalent elements, members, and processings illustrated in the respective drawings, and a repeated description is appropriately omitted. In addition, the scale or shape of each part illustrated in the respective drawings is set for convenience of easy description, and is not construed as limiting unless otherwise mentioned. In addition, when the terms such as "first" and "second" are used in the description or in the claims, these terms do not indicate any order or importance order unless otherwise mentioned, and are intended to distinguish a certain configuration from other configurations FIG. 1 is a horizontal cross-sectional view illustrating a schematic structure of a vehicular exterior rear view device according to an exemplary embodiment. FIG. 2A is a perspective view illustrating a schematic structure of a vehicular lamp according to an exemplary embodiment. FIG. 2B is a perspective view illustrating a schematic structure of a light source included in the vehicular lamp according to the exemplary embodiment. Here, in FIG. 1, a rear view unit 6 is schematically illustrated.

The vehicular exterior rear view device 1 according to the present exemplary embodiment is a device that is disposed outside a vehicle body and shows the rear side of the vehicle. The vehicular exterior rear view device 1 is provided, for example, on a lateral side of the vehicle body, and corresponds to a conventional door mirror or fender mirror.

The vehicular exterior rear view device 1 includes a housing 2, a cover 4, a rear view unit 6, and a vehicular lamp 100. The housing 2 has a concave portion 2a, which is recessed toward the vehicle body front side in the surface that faces the vehicle body rear side. The rear view unit 6 is accommodated in the concave portion 2a. The cover 4 is a member that is disposed on the vehicle body front side of the housing 2 and the rear view unit 6 and hides, for example, an attachment structure of the rear view unit 6 to the housing 2 from the outside. The cover 4 has a through hole 4a formed in a predetermined position to connect the inside and the outside of the cover 4. The rear view unit 6 includes at least one of a rearview mirror and a rear view camera. A driver may grasp the situation of the rear side of an own vehicle by viewing an image photographed by the rear view unit 6.

The vehicular lamp 100 is a side turn signal lamp (STSL) mounted in the vehicular exterior rear view device 1. The vehicular lamp 100 includes a light guide body 102, a light source 104, and a light source accommodating unit 106.

The light guide body 102 is configured with a two-color molded article of a light-transmitting member 108 and a non light-transmitting member 110. Thus, the light guide body 102 is an integrally molded article of the light-transmitting member 108 and the non light-transmitting member 110. For example, the light-transmitting member 108 is formed of a transparent resin, and the non light-transmitting member 110 is formed of a colored resin. The non light-transmitting member 110 is, for example, white. Accordingly, the light-transmitting member 108 is a member that has higher light transmittance than the non light-transmitting member 110, and the non light-transmitting member 110 is a member that has lower light transmittance than the light-transmitting member 108. The light guide body 102 is obtained by injection molding one member of the light-transmitting member 108 and the non light-transmitting member 110, and subsequently injection molding the other member to be bonded to the previously molded member.

The light guide body 102 has a rod shape. In addition, the light guide body 102 has a curved portion. The light guide body 102 of the present exemplary embodiment has a columnar shape curved from one end side to the other end side. The diameter of the light guide body 102 is, for example, within a range from 5 mm to 8 mm. Both the light-transmitting member 108 and the non light-transmitting member 110 extend from one end to the other end of the rod. That is, both the light-transmitting member 108 and the non light-transmitting member 110 have a curved rod shape and side surfaces of the respective rods are bonded to each other. A substantially half of the light guide body 102 in the circumferential direction of the rod is configured as the light-transmitting member 108, and the remaining substantially half is configured as the non light-transmitting member 110.

The light source accommodating unit 106 is fixed to one end of the light guide body 102. The light source accommodating unit 106 has a substantially cylindrical shape and the light source 104 is inserted therein. The light source 104 is configured with, for example, an LED unit. The LED unit serving as the light source 104 includes an LED 112 and a mounting unit 114. The mounting unit 114 is configured to mount the LED 112 thereon, and is detachably mounted inside the light source accommodating unit 106. The light source 104 is disposed so as to introduce light to the light-transmitting member 108. Specifically, the light source is disposed such that one end surface of the light-transmitting member 108 and the light emission surface of the LED 112 face each other.

The light-transmitting member 108 has reflective steps 116. The reflective steps 116 are provided on a first surface 108a of the light-transmitting member 108, which is in contact with the non light-transmitting member 110. The reflective steps 116 are optical elements that emit the light of the light source 104, which is incident on the light-transmitting member 108, from a second surface 108b, which is opposite the first surface 108a. The light of the light source 104 is introduced from one end of the light-transmitting member 108 and moves toward the other end of the light-transmitting member 108. In this process, some light is reflected toward the second surface 108b by the reflective steps 116, thereby being emitted from the second surface 108b to the outside of the light-transmitting member 108. Accordingly, the second surface 108b configures the light emission surface of the light guide body 102. In addition, the non light-transmitting member 110 serves to prevent the light within the light-transmitting member 108 from being emitted from the first surface 108a to the outside of the light-transmitting member 108.

The housing 2 and the cover 4 configure a chamber 118 in which the vehicular lamp 100 is accommodated. The light source 104 of the vehicular lamp 100 is disposed inside the cover 4, i.e. inside the chamber 118. In addition, the light guide body 102 is inserted through the through hole 4a. Accordingly, at least a portion of the light guide body 102 is exposed outside the cover 4, i.e. outside the chamber 118. The vehicular lamp 100 is fixed to the cover 4 in a state where the light guide body 102 is exposed to the outside. In a state where the vehicular lamp 100 is fixed to the cover 4, the second surface 108b of the light guide body 102 is exposed outside a vehicle body on which the vehicular lamp 100 is mounted. The second surface 108b is not covered with, for example, an outer cover, which is provided in a general lamp, and is exposed to the external environment in which the vehicle body is placed. That is, the second surface 108b configures a portion of the outer appearance (contour) of the vehicle body.

The cover 4 has a concave portion 4b, which extends from the vehicle body front side and the center side in the vehicle width direction to the vehicle body rear side and the outer side in the vehicle width direction. The through hole 4a is located in one end of the concave portion 4b. A portion of the light guide body 102, which protrudes from the through hole 4a to the outside of the chamber 118, extends into the concave portion 4b. In addition, the vehicular lamp 100 is fixed to the cover 4 as the light guide body 102 is fitted into the concave portion 4b.

In addition, the end portion of the light guide body 102, which is opposite the light source 104, may be wholly the light-transmitting member 108. That is, the end of the non light-transmitting member 110 may be covered with the light-transmitting member 108. This may allow the light of the light source 104 to be easily emitted to the rear side of the vehicle body.

As described above, the vehicular lamp 100 according to the present exemplary embodiment includes the light guide body 102, which is configured with a two-color molded article of the light-transmitting member 108 and the non light-transmitting member 110, and the light source 104, which introduces light to the light-transmitting member 108. In addition, the light guide body 102 has a curved portion. In addition, the light-transmitting member 108 has the reflective steps 116 provided on the first surface 108a, which is in contact with the non light-transmitting member 110, in which the reflective steps 16 emit the light of the light source 104 from the second surface 108b, which is opposite the first surface 108a. The second surface 108b is exposed outside the vehicle body on which the vehicular lamp 100 is mounted.

In the vehicular lamp 100 according to the present exemplary embodiment, the light guide body 102 is configured with a two-color molded article of the light-transmitting member 108 and the non light-transmitting member 110, and the second surface 108b of the light guide body 102 is exposed outside the vehicle body. Accordingly, the light guide body 102 is used in an exposed state. Therefore, the vehicular lamp 100 may be remarkably miniaturized. In addition, due to the miniaturization of the vehicular lamp 100, the vehicular lamp 100 may be mounted in the vehicular exterior rear view device 1, which is miniaturized owing to a mirrorless structure thereof. Alternatively, by mounting the small vehicular lamp 100 in the vehicular exterior rear view device 1, miniaturization of the vehicular exterior rear view device 1 may be promoted.

In addition, the vehicular lamp 100 according to the present exemplary embodiment includes only the light guide body 102, the light source 104, and the light source accommodating unit 106. That is, the vehicular lamp 100 does not include a lamp body and an outer cover to accommodate the light guide body and the light source, which are included in a general vehicular lamp. Therefore, a lamp space between the lamp body and the outer cover and between the light guide body and the light source may be omitted. Accordingly, a very small vehicular lamp may be realized.

In addition, in the vehicular exterior rear view device 1 according to the present exemplary embodiment, the light guide body 102 is exposed to the outside from the through hole 4a formed in the cover 4. Thereby, the vehicular exterior rear view device 1 having a novel structure may be provided. In addition, the design characteristics and aesthetic appearance of the vehicular exterior rear view device 1 may be improved. In addition, since the vehicular lamp 100 is fixed to the cover 4 by forming the concave portion 4b in the outer surface of the cover 4 and fitting the light guide body 102 into the concave portion 4b, a fixing structure of the vehicular lamp 100 may be more simplified. In addition, the assembly efficiency of the vehicular exterior rear view device 1 may be improved.

In addition, when the light guide body 102 is configured with a two-color molded article of the light-transmitting member 108 and the non light-transmitting member 110, the light guide body 102, which has a curved portion and also has the reflective step 116, may be realized. In addition, the number of constituent elements of the vehicular lamp 100 may be reduced. In addition, since the light-transmitting member 108 and the non light-transmitting member 110 are in contact with each other, the amount of light emitted from the second surface 108b may be increased compared to a structure in which both are spaced apart from each other. Accordingly, the utilization rate of light of the light source 104 may be increased.

In addition, the non light-transmitting member 110 covers the first surface 108a provided with the reflective steps 116. Thereby, it is possible to prevent, for example, dust or moisture from being attached to the reflective steps 116. In addition, it is possible to prevent the reflective steps 116 from being damaged. In this way, the light distribution characteristics of the vehicular lamp 100 may be maintained. In addition, it is possible to prevent the inside of the chamber 118 from being visible through the light guide body 102.

The vehicular lamp 100 according to the exemplary embodiment may be any lamp other the side turn signal lamp. In addition, the light source 104 may be, for example, a semiconductor light-emitting element other than the LED, such as, for example, a laser diode (LD) or an organic or inorganic electroluminescence (EL), or may be a discharge bulb, an incandescent lamp, or a halogen lamp. A portion of the light guide body 102 may be curved.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A vehicular lamp comprising:
   a light guide body including a light-transmitting member and a non light-transmitting member, the light-transmitting member and the non light-transmitting member being formed together as a two-color molded rod having a first end and an opposing second end; and
   a light source configured to introduce light to the light-transmitting member,
   wherein the light guide body has a curved portion,
   the light-transmitting member has at least one reflective step formed on a first surface thereof, which contacts and covers a portion of the non light-transmitting member, so as to emit the light of the light source from a second surface of the light-transmitting member, which is opposite the first surface, and
   the second surface is exposed outside a vehicle body on which the vehicular lamp is mounted.

2. The vehicular lamp of claim 1, wherein the vehicular lamp is mounted in a vehicular exterior rear view device.

3. The vehicular lamp of claim 1, wherein the vehicular lamp is mounted in a vehicular exterior rear view device.

4. A vehicular exterior rear view device comprising:
   a rear view unit including at least one of a rearview mirror and a rear view camera;
   a cover disposed on a vehicle body front side of the rear view unit; and
   the vehicular lamp according to claim 1.

5. The device of claim 4, wherein the cover has a through hole formed at a predetermined position so as to connect an inside and an outside of the cover, and
   the vehicular lamp is fixed to the cover in a state where the light source is located inside the cover and the light guide body is inserted through the through hole so as to be exposed outside the cover.

6. The vehicular lamp of claim 1, wherein the light-transmitting member and the non light-transmitting member extend together from the first end of the rod to the second end of the rod.

7. The vehicular lamp of claim 1, wherein substantially half the rod in a circumferential direction of the rod is configured as the light-transmitting member and a remaining half is configured as the non light-transmitting member.

8. A vehicular exterior rear view device comprising:
   a housing including a concave portion;
   a rear view unit including at least one of a rearview mirror and a rear view camera and configured to be mounted in the concave portion of the housing;
   a cover disposed on the housing and forming a chamber together with the housing, the cover having a hole formed at a predetermined position to connect an inside and an outside of the cover;
   a light guide body including a light-transmitting member and a non light-transmitting member, the light-transmitting member and the non light-transmitting member being formed together as a molded rod having a first end and an opposing second end; and
   a light source mounted at the first end of the rod and configured to introduce light to the light-transmitting member,
   wherein the light guide body is fixed to the cover in a state where the light source is located inside the cover and the light guide body is inserted through the through hole so as to be exposed outside the cover.

9. The vehicular exterior rear view device of claim 8, wherein the light-transmitting member has a reflective step formed on a first surface thereof, which is in contact with the non light-transmitting member, so as to emit the light of the light source from a second surface of the light-transmitting member, which is opposite the first surface.

* * * * *